Patented May 17, 1938

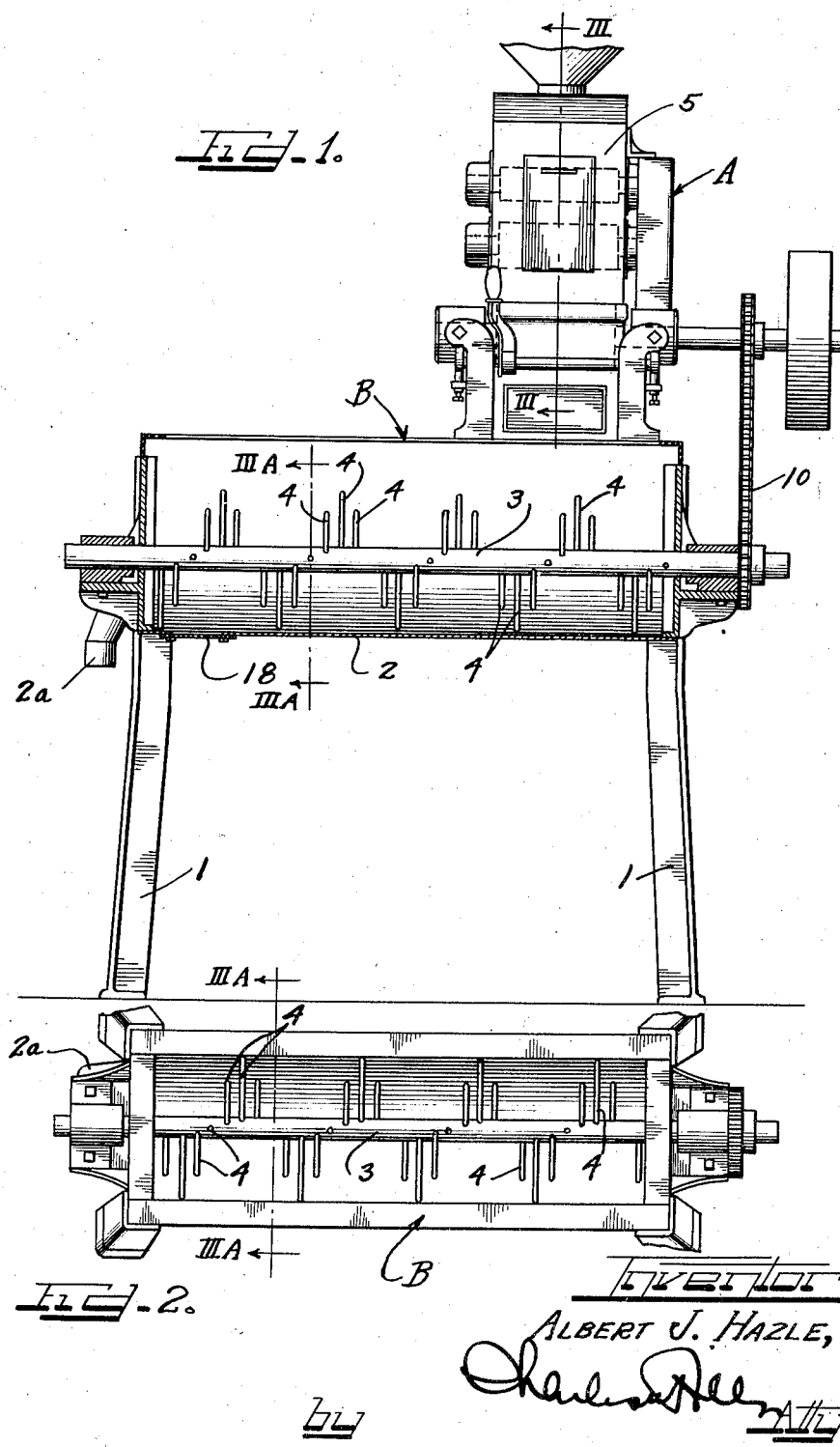

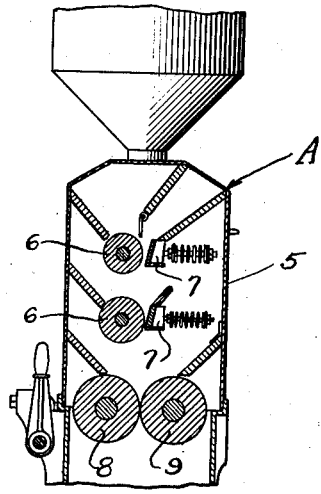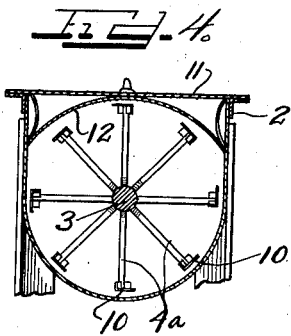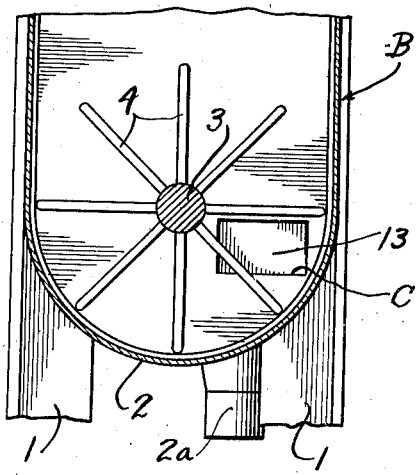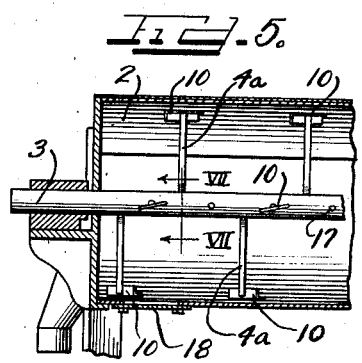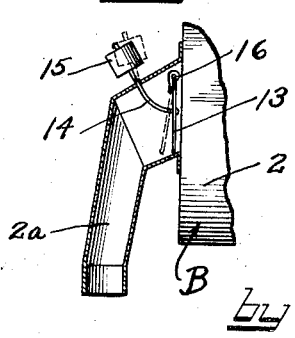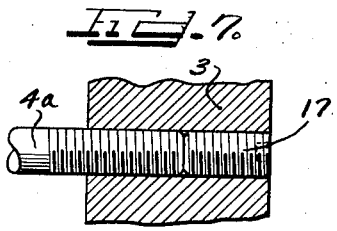

2,118,010

UNITED STATES PATENT OFFICE 2,118,010

PROCESS OF TREATING COFFEE AND PRESERVING ITS FLAVOR

Albert J. Hazle, Jr., Chicago, Ill., assignor to B. F. Gump Company, Chicago, Ill., a corporation of Illinois Original application October 24, 1931, Serial No. 570,863. Divided and this application August 9, 1937, Serial No. 158,078

3 Claims. (Cl. 83—18)

This invention relates to a process for treating coffee and preserving its flavor after the coffee has been suitably ground or granulated, and more particularly to a process of treating ground coffee containing flaky chaff so as to break up thoroughly the relatively large free particles of coffee chaff and to render the same substantially invisible in the ensuing product.

In the past it has been the practice to use plate mills for producing fine grinds of coffee, and roll mills for producing steel cut coffee consisting of small, sharp granules with very little powdered coffee. A plate mill in producing its usual fine grinds will simultaneously reduce the chaff, as fine as the coffee. The powdered product or flour coffee it produces is not satisfactory for many methods of brewing coffee.

On the other hand, when the so-called roll type of mill is employed for cracking and breaking up the coffee beans, it has been found that while the ensuing product has coffee particles of relatively uniform size, considerable quantities of coffee chaff are present in the product by reason of the fact that the chaff is not broken up to any substantial extent as is the case in a plate mill. However, coffee which has been broken up or granulated in a roll mill has been found to be more satisfactory for the making of coffee beverage on account of the fact that the particles are more uniform and enable better extraction. However, in view of the fact that coffee produced upon a roll mill contains a considerable amount of flaky chaff, it has heretofore been necessary to remove the chaff, then comminute the same, and then return the same to and mix it with the granulated coffee. This involved a long, laborious, and expensive process.

Now it is the aim of my present invention to provide a process of treating granulated coffee, such as has been ground in a roll mill, and which contains flaky chaff, so that the chaff will be comminuted and concealed without the necessity of first removing the chaff and then separately grinding the same. I accomplish this by subjecting the coffee mass including the coffee particles of relatively uniform size and the loose flakes of chaff to a rapid agitation or high speed impacts while at the same time breaking up centrifugal flow of the coffee mass whereby the coffee particles are polished or scoured and the fragile flakes of chaff are finely comminuted and blended with the coffee to a substantially invisible state.

It is also an object of my invention to subject coffee ground on a roll mill to such a whipping action as to not only effect a thorough comminution of the chaff and coffee particles but in addition thereto to prevent any liberated free chaff from being ejected or carried off of the coffee mass at the discharge point and to cause the finely comminuted chaff to be colored by coffee oil by reason of the rubbing of such chaff particles of the mass.

In addition thereto I aim to provide a process of treating coffee produced on a roll mill in such a way that not only will the chaff therein be thoroughly comminuted but in addition thereto the mass will be at all times subjected to a back pressure so as to prevent or minimize the possibility of air currents or the like arising from the whipping action blowing the liberated and free chaff from the coffee mass.

Another and further object of this invention is to provide a process for treating coffee which has been first cracked and then granulated in a roll mill in such a manner as aforesaid that not only is it possible to comminute thoroughly the chaff in the coffee mass but in addition thereto it is possible to blend the coffee mass and chaff together in the presence of the gases set free during the cracking and milling of the coffee beans so that substantially the original flavor of the coffee may be preserved in the ultimate product.

In accordance with the features of the present invention, there is provided a process of preparing coffee which has been first cracked and then granulated in a roll mill and which coffee includes coffee particles of relatively uniform size as well as relatively large flakes of chaff, which process consists in propelling the coffee mass thus formed in a continuous stream along a given path, contemporaneously subjecting the mass to a rapid agitation or high speed impacts to comminute and conceal the chaff and breaking up the centrifugal flow of the coffee mass so that the mass will not rotate as a unit but will be thoroughly agitated and commingled.

My novel process is further characterized by the feature of subjecting the forwardly moving mass to a back pressure of a predetermined amount adapted to be overcome in response to the discharge pressure of the coffee mass but sufficient to enable the coffee particles and chaff of the mass to bear frictionally against each other to color the chaff with the liberated coffee oil and to effect substantially a complete comminution of the chaff by the coffee particles. This back pressure is particularly advantageous in that it substantially prevents air currents occasioned by the propulsion of the coffee mass and the whipping of the same from carrying off of the coffee mass about to be discharged any liberated particles of chaff which may lodge on or adjacent the end of the top of the mass.

Still another feature of my invention relates to the agitating of the mass in a substantially closed path or zone so that the coffee mass being treated in the ensuing product loses substantially none of its aroma.

Other objects and features of this invention will more fully appear from the following detailed description taken in connection with the accompanying drawings. It is believed that my novel process will be fully understood from a description of an apparatus by which it may be practiced, which apparatus is fully disclosed in my copending application Serial No. 570,863, filed October 24, 1931. Accordingly, it will be appreciated that the subject matter of my present process has been divided from my aforesaid copending application.

In the accompanying drawings which illustrate a preferred form of apparatus in which similar reference numerals refer to similar features in the different views:—

Figure 1 is a part elevational and part sectional view of an apparatus involving this invention for carrying out my novel process.

Figure 2 is a top plan view of the agitating part of the apparatus with parts removed.

Figure 3 is a fragmentary sectional view taken upon the line III—III of Figure 1 showing details of a type of roll mill which may be used to grind the coffee beans.

Figure 3A is an enlarged fragmentary cross sectional view of the agitating device taken on the lines 3A—3A of Figures 1 and 2 and showing the non-circular contour of the top of the agitating chamber.

Figure 4 is a fragmentary cross sectional view through a modified form of agitating apparatus.

Figure 5 is a fragmentary longitudinal sectional view through a still further modified form of agitating apparatus.

Figure 6 is an enlarged detail sectional view showing a device for enabling the practicing of my novel back pressure steps.

Figure 7 is an enlarged sectional view taken upon the line VII—VII of Figure 5.

Since this invention is not primarily concerned with what steps are employed in the grinding or granulating of the coffee beans, it will be appreciated that any suitable mill may be used for cracking the coffee such, for example, as a roll mill, one form of which I have illustrated in Figures 1 and 2. In these figures, there is illustrated a roll mill A which first cracks the roasted coffee beans, then granulates the same into a coffee mass consisting of coffee particles of relatively uniform size and particles or flakes of chaff of substantial size.

The roll mill A is illustrated as being part of an apparatus which includes supporting legs or standards 1 upon which an agitator B, comprising a drum or casing 2, is mounted having a discharge spout 2ª at its outer or discharge end which communicates with the interior of the casing at a point above the bottom thereof as shown in Figure 3A so that an accumulation of the reduced mass may take place therein. Extending longitudinally through the casing and journalled in suitable bearings thereon is an agitating shaft 3 from which extend in radial directions agitating or impact pin members 4 which are spaced spirally of the shaft about two inches apart. The shaft is adapted to be rotated at about 600 revolutions per minute for such a spacing.

While different spacing of the pins and a different speed of rotation of the agitating shaft may be used, it has been found that very satisfactory results are obtained by spacing the agitating pins about two inches apart spirally of the shaft and rotating the same at about 600 revolutions per minute so that the proper attrition between the particles of coffee and the particles of coffee and chaff may be attained for producing an even uniform mixture in which the chaff is thoroughly comminuted and concealed in the coffee product.

At the outlet C (Fig. 3A) of the drum 2 there is a door or gate 13 (Figure 6) to which a curved stem 14 is attached that extends through an aperture in the wall of the spout and that is equipped with a weight 15 at its outer end for urging the door toward its closed position. The door 13 is hinged upon a rod 16 at its upper margin. This gate, as will be described more fully hereinafter, will tend to restrict the flow of the finished product from the drum 2.

The granulating mill A is mounted upon the drum 2 of the agitator B and discharges the granulated mass through and directly into the top of the drum 2 adjacent an end thereof. This granulating mill A consists of a suitable and substantially airtight casing 5 in which are journalled a pair of vertically spaced corrugated cracker rolls 6 that cooperate with adjacent cracker bars 7 for breaking down the coffee beans. Below the cracker bars 7 there are a pair of cooperating granulating rolls 8 and 9. These rolls may be driven by any suitable mechanism. The agitating shaft 3 is preferably connected by sprocket gearing 10 to one of the shafts of the rolls 8 or 9.

In Figures 4 and 5, a modified form of agitating pin has been illustrated. This modified form of pin which is represented by the reference 4ª is provided with a blade 10 at its outer end which may be set at a suitable angle to the axis of the agitating rotor to convey and expedite the movement of the mass toward the outlet and thuswise prevent heating of the mass more quickly and to clean out more thoroughly the cylinder of its coffee product. The stems 4ª are preferably threaded in the shaft 3 so that the blades can be adjusted to any desirable angle and at a suitable distance from the wall of the drum. A gauge plug 17 (Figure 7) may be screwed in the shaft 3 opposite the end of each stem 4ª to regulate the effective lengths of such stems. The casing 2 is adapted to be closed except directly under the mill 5. A cover 11 (Figure 4) having an interior concave surface 12 to prevent the coffee product from lodging in the corner of the casing may be used to close the top of the casing.

A cleaning out outlet is provided in the bottom of the drum and this outlet is normally closed by a slide 18 which may be shifted or removed to uncover the outlet at the end of a run or when it is desired to clean out the drum so that the accumulations below the discharge gate may be readily removed.

In the operation of this apparatus, the coffee beans are put into the mill A and are cracked by the two cracker rolls and bars and granulated by the rolls 8 and 9. Most of the chaff is liberated in flakes of substantial size by these rolls and the combined chaff and coffee particles descend as a mass directly into the drum 2 of the agitator B in which the agitating shaft rotates at a high rate of speed. It will be noted that the mill A is positioned adjacent the end of the drum 2 which is remote from the spout 2a with the result that the granular mass and the chaff will travel in a given path or zone through the drum towards the spout 2a through which it will be discharged. The rapid rotation of the pins will cause the proper attrition of the particles of coffee and thoroughly comminute the chaff which is mixed with the coffee through a whipping and scouring action so that the chaff is practically concealed in the product that issues from the spout 2a and a uniformly blended and mixed product is obtained.

It will be appreciated that this method and apparatus eliminates the use of sieves, chaff removing means, chaff grinding means, and tailings conveyor that were heretofore necessary in making steel cut coffee.

From the foregoing description, it is, therefore, apparent that a coffee which has been cracked and granulated is transmitted directly to the mixing or comminuting chamber of drum 2 which has a closed connection with the housing 5 in which the roll mill is enclosed. As a consequence, any aromas or gases, such as $CO_2$ gas, liberated during the breaking up of the coffee beans, are allowed to permeate the forwardly propelled mass in the comminuting chamber 2. This insures preservation of the original flavor of the coffee.

It will also be noted from Figures 2 and 3A that chamber 2 has a non-circular top wall which enables the centrifugal flow of the agitated coffee mass to be broken up so that the mass will not rotate as a solid unit and will thus be subjected to a thorough agitating and communiting action.

In addition thereto, by reason of the rapid movement of the pins or comminuting elements 4—4a, as well as the fact that chamber 2 is of such shape as to break up the centrifugal flow of the coffee mass, the relatively large flakes of chaff which have been liberated during the coffee cracking operation are thoroughly comminuted in the coffee mass. Moreover, this coffee mass does not have any substantial amount of powder-like substance such as is objected to when the coffee is broken up in a plate mill.

By reason of the rapid whipping action of the comminuting elements, the coffee particles are scoured or polished contemporaneously with the comminuting of the flakes of chaff. In addition thereto, the flakes of chaff are caused to be frictionally pressed against the coffee particles so that the comminuting of such chaff also enables the chaff to be colored to a considerable extent by the coffee oils present in the forwardly moving mass. It, therefore, follows that not only does the finely comminuted chaff thoroughly commingle with the mass, but in addition thereto, it is rendered substantially invisible in the ensuing product.

I have found that by subjecting the forwardly propelled coffee mass to a back pressure variable in response to forward movement of the mass it is possible to prevent any air currents circulating through the comminuting chamber of drum 2 from carrying out of the chamber free particles of chaff which may get to the top of the mass. This feature is effected by the use of the gate or valve 13 which is subjected to the pressure of a weight 15.

It will be appreciated that the weight 15, as well as the leverage of the hinged gate, applies a predetermined pressure against any laterally ejected coffee mass that may be pressed against the door through the discharge opening shown at C in Figure 3A. In other words, until a predetermined quantity of coffee mass has accumulated at the discharge opening C sufficient to overcome the pressure exerted by the gate 13 and its weight 15, no discharge of material from the drum 2 is effected. However, after a sufficient amount of the material has accumulated in the opening C to overcome the pressure of the gate and its weight 15, it will be evident that the gate will swing open and allow a discharge of the material. This discharge is, of course, an intermittent one, since after each discharge of a given quantity of material, sufficient time must elapse for an additional quantity of material to build up against the gate and in the opening C for again overcoming the pressure of the gate.

This feature is highly advantageous in that it precludes any possibility of loose or free chaff in the vicinity of the discharge opening C from being blown out of the opening prior to such chaff having had an opportunity to be properly comminuted and commingled in the coffee mass. By reason of the aforesaid holding back of the coffee mass, a much more thorough and complete comminution of the chaff in the coffee mass is made possible. Then, too, the gate 13 enables the agitating chamber of drum 2 to be closed so that the agitating, mixing, and comminuting actions take place in a closed area or zone whereby the coffee mass loses substantially none of its aroma.

Another advantage of my invention resides in the fact that the process increases the density of the finished product so that it may be packaged in smaller containers than would have been feasible prior to the subjecting of the ground coffee to my novel process of treating the same. In this respect, it will be appreciated that a considerable saving can be effected since my process enables the ensuing product to be sold in smaller packages than would otherwise be feasible.

I am aware that numerous details of the process may be varied through a wide range without departing from the principles of this invention, and I, therefore, do not purpose limiting the patent granted hereon otherwise than necessitated by the prior art.

I claim as my invention:

1. The process of preparing coffee that has been broken up into coffee particles of relatively uniform size as well as into particles of chaff which includes the steps of propelling the coffee mass thus formed in a continuous stream along a given path of substantial length longitudinally to an axis and simultaneously causing said stream to flow centrifugally about said axis while being subjected to a beating action, the centrifugal flow being broken up along the periphery of said stream throughout a substantial portion of the length of said path to cause relative movement between the coffee particles and liberated chaff at the place of interruption so as to subject the particles of chaff to such an abrading action by the rotating coffee particles as to reduce and commingle the chaff with the coffee particles into a product in which the chaff is substantially concealed.

2. The process of preparing coffee that has been broken up into coffee particles of relatively uniform size as well as into particles of chaff which includes the steps of propelling the coffee mass thus formed in a continuous stream along a given path of substantial length longitudinally to an axis and contemporaneously rotating a substantial portion of the mass about said axis and subjecting it to a beating action while at the same time interrupting the free rotation of a peripheral part of the whirling mass through a substantial part of said path to cause relative movement between the coffee particles and liberated chaff at the place of interruption so as to subject the particles of chaff to such an abrading action by the rotating coffee particles as to reduce and commingle the chaff with the coffee particles into a product in which the chaff is substantially concealed, maintaining the discharge end of said path closed under a back pressure and overcoming said back pressure to open the discharge end of the path by the pressure of accumulated coffee in the path whereby to prevent particles of free chaff from being prematurely discharged from said path.

3. A method of treating roasted coffee beans, including the following steps: first granulating the coffee beans, and second working substantially all of the granulated coffee and any liberated chaff together for a period of time sufficient to pulverize the chaff and commingle it with the coffee, said working including the steps of propelling the granulated coffee mass in a continuous stream along a given path of substantial length longitudinally to an axis and contemporaneously rotating a substantial portion of the mass about said axis and subjecting it to a beating action, while at the same time interrupting the free rotation of a peripheral part by breaking up the centrifugal flow of the whirling mass through a substantial part of said path to cause relative movement between the coffee particles and liberated chaff at the place of interruption whereby the chaff is substantially concealed.

ALBERT J. HAZLE, JR.